United States Patent Office 3,470,731
Patented Oct. 7, 1969

3,470,731
MEASURING INSTRUMENT FOR DETERMINING THE ENERGY OF SHOCKS OF VIBRATING MACHINES, ESPECIALLY OF JOLT-MOLDING MACHINES
Leszek Zurawski, Os. Kolorowe 3/20, Krakow 30, Poland
Filed Dec. 28, 1966, Ser. No. 605,267
Claims priority, application Poland, Dec. 31, 1965,
P 112,333
Int. Cl. G01m 17/04; G01n 3/62
U.S. Cl. 73—11                              2 Claims

ABSTRACT OF THE DISCLOSURE

A shock measuring instrument which includes a cylindrical housing adapted for connection to a machine, the shock characteristics of which are to be measured. A rod is provided which extends through this housing, a piston being connected to an end of the rod and accommodated in a cylinder. A weight is provided on the rod between the piston and the housing and on the other side of the housing the rod is encircled by a displacable ring which is displaced when the weight causes the rod to be displaced through the housing under the influence of shock. A spring is provided which opposes the movement of the weight and rod. In addition, a bridge may be provided of the electrical type which converts displacement of the ring into electrical measurement. There may be associated in the cylinder and with the piston a unidirectional device which permits free movement of the piston in the cylinder in one direction of movement of the piston.

---

The invention relates to instruments for measuring the energy of shocks of vibrating machines, especially of jolt-molding machines but also of other machines such as vibro-hammers, vibro-sinking machines, and so forth.

Hitherto the energy of shocks of vibrating machines was determined by means of indirect measurements, with a method which required too much time and complicated calculations. The only known instrument for measuring the energy of shocks is based upon the use of a lever train fitted with a weight and a spring, in which the weight affected by a shock causes the elongation of the spring with a simultaneous deflection of an associated hand. This instrument does not, however, assure correct indications of the measured value, as there is a possibility of formation of resonance and also due to the slow decay of specific oscillations of the arrangement.

Moreover the rating curve of the described instrument shows a non-linear dependence between the energy of shocks and indications of the instrument.

The instrument for measuring the energy of shocks of vibrating machines, according to the invention is free from those disadvantages.

It consists of a housing in which there is slidably arranged a vertical rod, at its upper end projecting above the housing, rated and provided with an indicating ring. At its lower part the rod is terminated with a piston which closes a unilaterally acting cylinder of a pneumatic damper. The rod is also equipped with a weight, the rod together with the weight abutting upon a stretched spring.

The indications of the instrument can be transmitted remotely by means of an electric bridge system.

Figure 1:
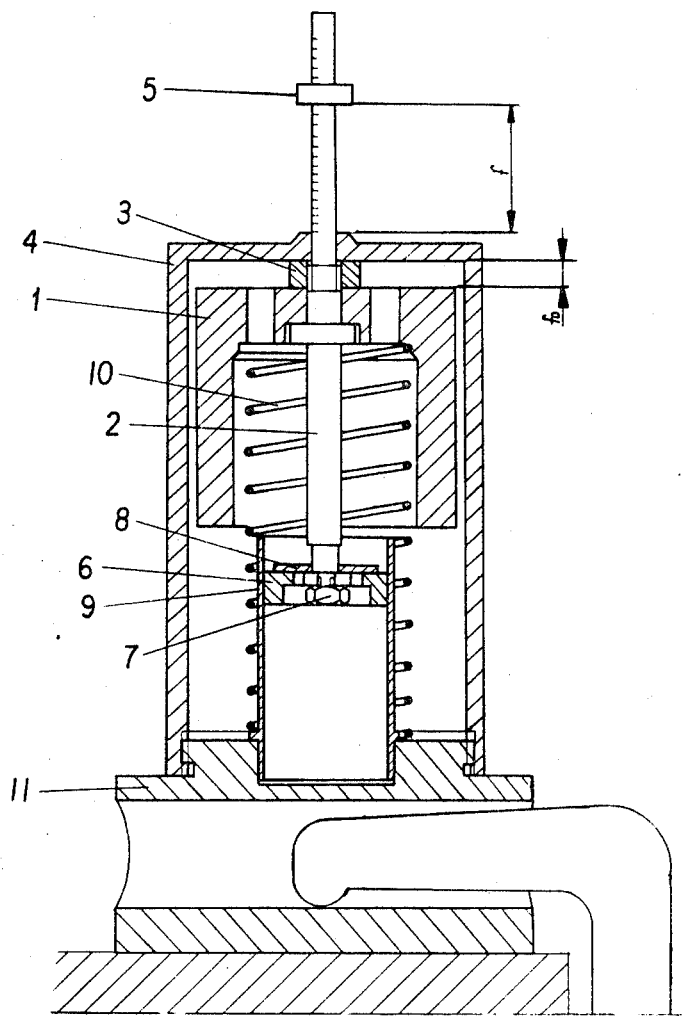
Figure 2:
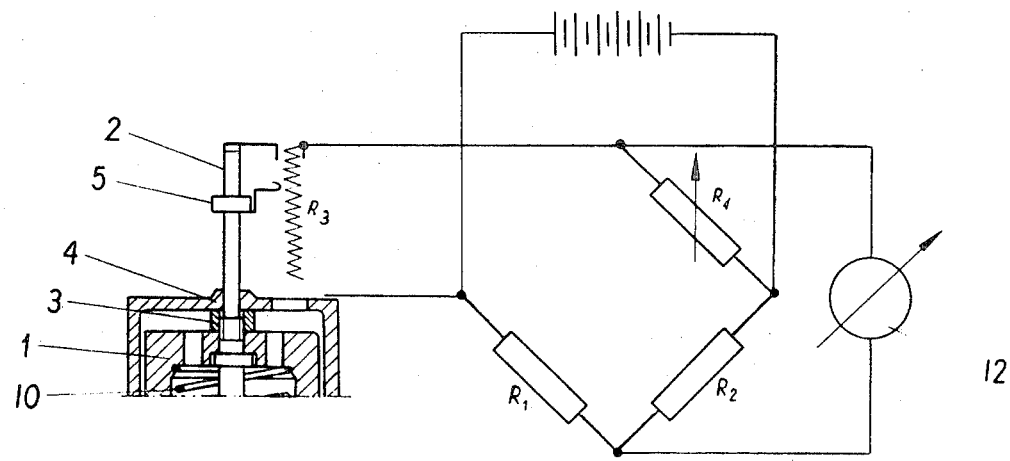

An exemplary embodiment of the invention is explained with reference to the attached drawing, in which:

FIG. 1 is a vertical section through an instrument provided in accordance with the invention; and FIG. 2 schematically illustrates the electric bridge system.

The instrument according to the invention comprises a weight 1 fixed on a rod 2 by means of a nut 3, which at the same time sets the distance between the weight 1 and the housing 4 of advantageously round cross section. The upper, rated part of the rod 2 projects above the housing 4 and is provided with a light ring 5 frictionally borne on this part of the rod 2. The lower end of the rod 2 is terminated with a piston 6, fixed to the rod by means of a nut 7. The piston 6 with a loose valve plate 8 closes the cylinder 9 of the pneumatic damper, which brakes the upward motion of the rod 2 with the weight 1. The rod 2 together with the weight 1 abuts upon a prestretched spring 10, which presses the weight 1 through the nut 3 against the bottom of the housing 4. The base 11 of the instrument has a port designed for fixing the instrument upon the table of the vibrating machine by means of a holder. The ring 5 located about the upper part of the rod 2 may be connected movably with a known electric bridge system (FIG. 2). The system consists of an electric gauge 12 rated in units of energy and a resistor $R_3$, which acts as the input converter of mechanical indications of the instrument. It is also equipped with a resistor $R_4$ used for balancing of the bridge and to adapt it to the voltage of the supply battery. The resistors $R_2$ and $R_3$ are the constant resistances of the bridge. In the case of application of the instrument according to the invention to slow-speed machines, the indications of the instrument can be reported directly from the scale, but for application of the instrument to high-speed machines, it is advantageous to transmit the indications of the instrument remotely through the electric bridge system.

During performing of the vibration of the table of a jolt-molding or other machine, with the instrument according to the invention fitted on it, the rod 2 travels downwards, and the ring 5 abuts upon the housing 4. After each shock, the rod 2 shifts out of the housing 4 to its initial position, but the ring 5 stops in the position resulting from the previous downward motion of the rod 2. The difference of positions reported from the rated section of the rod 2, before and after the shock, equals a quantity $f$, which is characteristic for the energy of shock, in accordance with the formula $$e = \frac{c(f+f_o)^2 - f_o^2}{2G}$$

where $f$=the operational spring deflection, $f_o$=the initial spring deflection, $c$=scale of spring, and $G$=sum of loadings carried by the spring.

During the downward motion of the rod 2, the valve plate 8 on the piston 6, as a result of the difference of pressures formed under and above the piston 6, takes a position which secures a free flow of the air through the holes in the piston 6. On upward motion of the rod 2, the valve plate 8 abuts on the piston 6, so the air can enter under the piston 6 only through the space provided between the piston 6 and the cylinder 9. This causes a damping of the return motion of the rod 2 in upwards directions. The weight, the spring and the clearance in the damper are chosen in such manner that the instrument responds only to technological oscillations of the vibrating machine, and is not sensitive to the changes of the momentum of masses in the remaining phases of the operational cycle of these machines.

The instrument according to the invention is characterized by a simplicity of its structure and reliability of operation, as well as by small overall dimensions which enable installing the same easily on the table of the vibrating machine. There exists also a possibility of using it on machines of different types and sizes.

The application of the unidirectionally operating pneumatic damper secures the inertia system of the instrument against creating specific oscillation and warrants the indications of the instrument to be true.

What I claim is:

1. A shock measuring instrument comprising a member of adapted for connection to a machine the shock characteristics of which are to be measured, a rod extending through said member, a piston on an end of said rod, a weight on the rod between said piston and member, a damping cylinder accommodating said piston, a spring urging said weight towards said member, a slidable element on the rod and separated from the weight by said member, the slidable element being displaced on the rod by engagement with said member as the weight causes the rod to be displaced through said member under the influence of shock, means associated with said piston in said cylinder to permit free movement of the piston in the cylinder in one direction of movement of the piston during which such movement is opposed substantially solely by said spring, and electrical bridge means coupled to said slidable element and converting displacement of the latter into electrical measurements.

2. A shock measuring instrument comprising a member adapted for connection to a machine the shock characteristics of which are to be measured, a rod extending through said member, a piston on an end of said rod, a weight on the rod between said piston and member, a damping cylinder accommodating said piston, a spring urging said weight toward said member, a slidable element on the rod and separated from the weight by said member, the slidable element being displaced on the rod by engagement with said member as the weight causes the rod to be displaced through said member under the influence of shock and means associated with said piston in said cylinder to permit free movement of the piston in the cylinder in one direction of movement of the piston during which such movement is opposed substantially solely by said spring, wherein the rod is provided with an index in the vicinity of said slidable element.

References Cited

UNITED STATES PATENTS

| 2,319,342 | 5/1943 | Perry | 73—12 |
| 2,852,243 | 9/1958 | Shepard | 73—517 |

FOREIGN PATENTS 745,102   2/1944   Germany.

JAMES J. GILL, Primary Examiner

J. W. WHALEN, Assistant Examiner

U.S. Cl. X.R.

73—12